United States Patent
Hardman et al.

(10) Patent No.: US 10,547,500 B1
(45) Date of Patent: Jan. 28, 2020

(54) DETERMINING SOURCES OF NETWORK PACKET LOSS

(71) Applicant: Amazon Technologies, Inc., Seattle, WA (US)

(72) Inventors: Price Langton Hardman, Seattle, WA (US); Jeremy Michael Devoll, Bellevue, WA (US); Shaohui Wang, Kenmore, WA (US)

(73) Assignee: Amazon Technologies, Inc., Seattle, WA (US)

(*) Notice: Subject to any disclaimer, the term of this patent is extended or adjusted under 35 U.S.C. 154(b) by 136 days.

(21) Appl. No.: 15/703,872

(22) Filed: Sep. 13, 2017

(51) Int. Cl.
*H04L 12/24* (2006.01)
*H04L 12/26* (2006.01)

(52) U.S. Cl.
CPC ........ *H04L 41/0677* (2013.01); *H04L 41/064* (2013.01); *H04L 43/0829* (2013.01); *H04L 43/10* (2013.01); *H04L 41/5035* (2013.01); *H04L 43/062* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 2006/0274760 A1* | 12/2006 | Loher | ................. | H04M 3/2236 370/395.52 |
| 2009/0198832 A1* | 8/2009 | Shah | ................... | H04L 41/0668 709/239 |
| 2018/0337839 A1* | 11/2018 | Bristow | ............... | H04L 12/4633 |
| 2019/0007503 A1* | 1/2019 | Zmijewski | .......... | H04L 43/0823 |

* cited by examiner

*Primary Examiner* — Saumit Shah
(74) *Attorney, Agent, or Firm* — Klarquist Sparkman, LLP

(57) ABSTRACT

Technologies are provided for determining sources of network packet loss in a network environment. The sources of packet loss can be determined by sending probe packets between devices in different areas in which the areas are connected via the Internet. From the probe packets, IP path information can be obtained. The IP path information can be annotated in order to identify nodes along forward and return paths between the areas. Packet loss can be assigned to the nodes using the annotated IP path information. Using the packet loss assigned to the nodes, epicenters of packet loss can be identified and corrective action can be taken.

18 Claims, 9 Drawing Sheets

FIG. 3

|  | | Return traceroute failure mode (where the last hop is) 320 | | | | |
|---|---|---|---|---|---|---|
|  | | Traceroute success | In source area, before egress device | In source area, at egress device | On the Internet | In destination area | In other area |
| Forward traceroute failure mode (where the last hop is) | Traceroute success | | | | | | |
| | In source area, before egress device | | | | Forward all | | |
| | In source area, at egress device | | | | Forward last seen | | |
| | On the Internet | | | Forward egress | | | |
| | In destination area | Forward last seen | Return last seen | Return egress | Return last seen | Round-trip all | |
| | In other area | Forward last seen | | | Forward last seen | | Return last seen |

Forward traceroute failure modes 310

US 10,547,500 B1

DETERMINING SOURCES OF NETWORK PACKET LOSS

BACKGROUND

An organization that provides services via the Internet relies on the Internet to connect with users of its services. If there are problems along the path within the Internet (e.g., network problems, routing problems, congestion, etc.) between the organization's network and the users, then the users may experience problems accessing the services of the organization (e.g., service interruptions or slowdowns). Locating the source of such problems can be difficult. In some cases, network operators use test packets to try to locate the source of a problem. However, individual test packets may only be of limited use. For example, they may only indicate if a particular device is up or down, or they may only indicate the state of a particular device at a single instant in time.

BRIEF DESCRIPTION OF THE DRAWINGS

FIG. 3 is a diagram depicting an example table for determining packet loss attribution.

DETAILED DESCRIPTION

Figure 1:
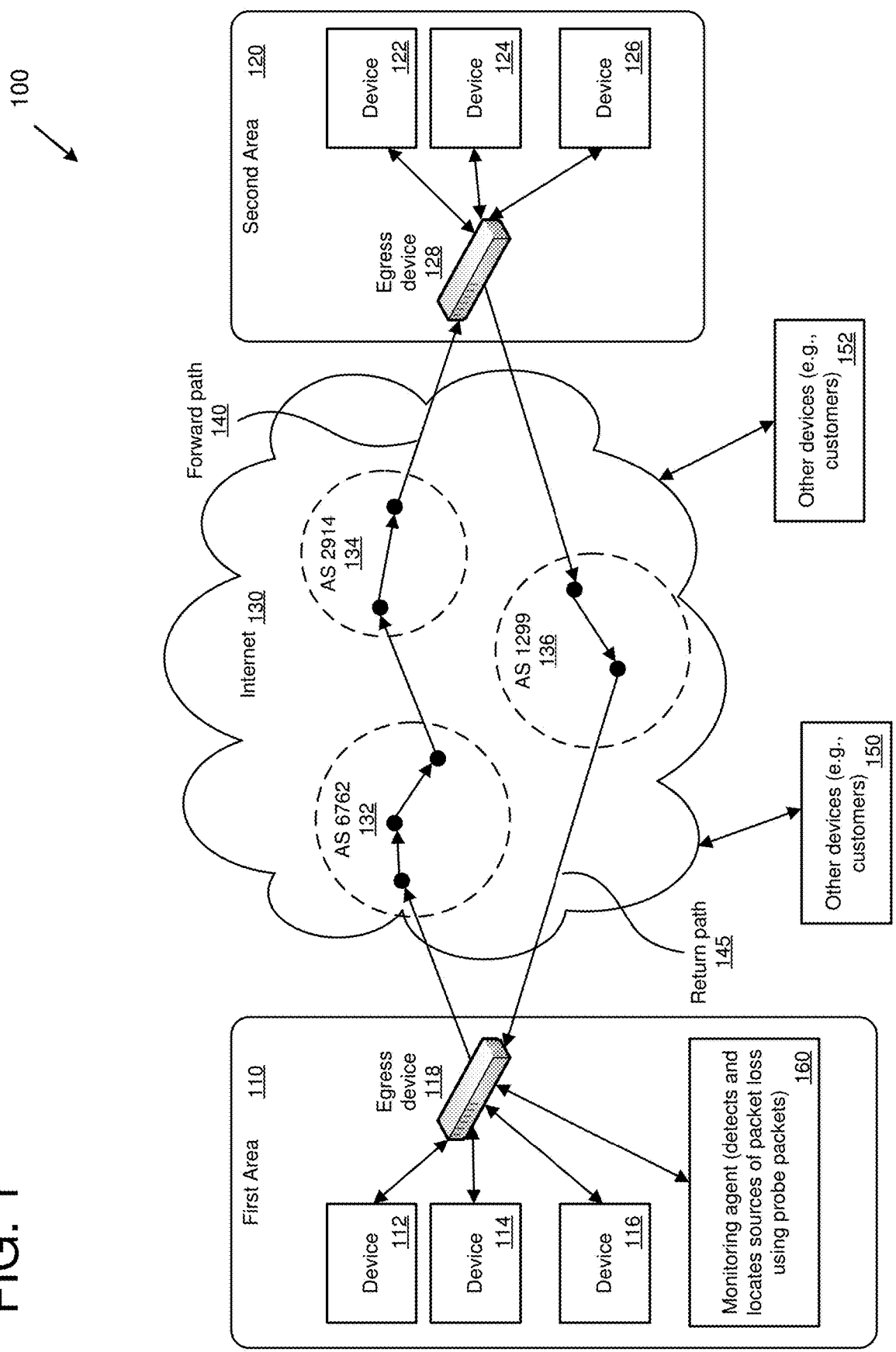
FIG. 1 is a diagram of an example network environment in which sources of network packet loss can be determined.

The following description is directed to technologies for determining sources of network packet loss in a network environment. The sources of packet loss can be determined by sending probe packets between devices in different areas in which the areas are connected via the Internet. From the probe packets, network path information can be obtained (e.g., Internet protocol (IP) path information obtained from traceroutes and/or other types of tools or protocols that can be used to determine network path information). The network path information can be processed in order to identify nodes (e.g., nodes that group related devices based on IP address, autonomous system, company, locations associated with a company, etc.) along forward and return paths between the areas. Packet loss can be assigned to the nodes using the processed network path information (e.g., based on whether traceroutes were successful and/or other rules). Using the packet loss assigned to the nodes, epicenters of packet loss can be identified (e.g., using a graph of the nodes), and network traffic routing decisions can be implemented.

In some implementations, determining sources of network packet loss involves measuring packet loss along an IP path between a device in a source area and a device in a destination area. IP path information is obtained for traceroutes (e.g., traceroute information generated from forward and return traceroutes) between the device in the source area and the device in the destination area, where network packets traverse external network carriers between the source area and the destination area. The IP path information is annotated, which includes determining locations and/or autonomous system numbers for corresponding IP addresses in the IP path information. Forward and return autonomous system (AS) paths, comprising nodes (representing the locations and/or autonomous systems), are identified within the annotated IP path information. Packet loss is assigned to at least one node along the AS paths based at least in part on results of the traceroutes (e.g., whether the traceroutes were successful, the last seen node before the traceroutes failed, etc.). Using the packet loss assigned to the nodes (e.g., along with packet loss assigned from other probe packets) epicenters of packet loss can be determined.

The technologies described herein can be used to detect and locate packet loss on external networks. External networks refer to the public networks (operated by various external network carriers) that make up the Internet. For example, a business can operate its own network that provides services to customers (e.g., data storage services, virtual server services, etc.) where the customers access the business network via the Internet. In order for the customers to successfully reach the business network, the various carrier networks on the Internet along the path need to be operating correctly. If there is a network problem along the path between the customer and the business network, then the customer may experience problems (e.g., dropped or intermittent network connection issues, slow network speeds, etc.) or be unable to access the business network at all. Due to such problems with the Internet carriers, the customers may experience problems even when the organization's network is operating correctly.

Detecting problems on the Internet can be difficult. For example, it can be difficult to determine where network packets are experiencing issues, and which device (or devices) are causing the problems. It can also be difficult to identify where problems are occurring most frequently along specific paths between source and destination areas that are connected to the Internet. For example, a specific carrier on the Internet may be experiencing problems (e.g., equipment issues or routing problems), which affects various paths through the Internet that intersect with the specific carrier.

Using the technologies described herein, problems on the Internet can be detected and located. For example, by analyzing probe packets (e.g., traceroutes and/or pings) between different areas connected to the Internet, and assigning packet loss based on the probe packets, the likely sources of packet loss can be detected. The likely sources can be identified as external carriers (e.g., identified by autonomous system number). In this way, the likely sources can be identified at a higher level than an individual device (e.g., at the level of autonomous systems or other groups of devices), which can provide a clearer and more useful picture of the problem. Once the likely sources of the packet loss are identified, network traffic decisions can be made. For example, if a particular area is connected to the Internet via two carrier networks (e.g., identified by their respective autonomous systems), and one of the carrier networks has been identified as a source of packet loss, network traffic can be switched to the other carrier. As another example, various routing decisions and routing policies can be adjusted to divert network traffic away from specific carrier networks (e.g., specific autonomous systems) that are experiencing packet loss.

FIG. 1 is a diagram of an example network environment 100 in which sources of network packet loss can be determined. In the example network environment 100, two areas are depicted, a first area 110 and a second area 120. The first area 110 and second area 120 are separate networks from the Internet 130. For example, the first area 110 and second area 120 can be networks of a business or organization that are located in different geographical locations (e.g., different states or countries) and/or in different network locations. For example, first area 110 could be a data center network of a business in the Seattle, Wash. area and the second area 120 could be another data center network of the business in the Portland, Oreg. area. The example network environment 100 is a simplified example, and the actual Internet has many more connected areas and connected networks, and many more carrier networks that make up the Internet.

In the first area 110, a number of devices are depicted, including device 112, 114, and 116. The devices 112, 114, and 116 could be server computers (e.g., running virtual machines), desktop computers, or any other type of computing device. While only three devices are depicted, the first area 110 can contain any number of computing devices (e.g., any number of servers, desktop computers, database systems, networking devices, routers, switches, etc.). In addition, the first area 110 contains an egress device 118, which is a routing device that connects the devices of the first area 110 to the Internet 130. While only one egress device is depicted, the first area 110 can contain any number of routing devices.

In the second area 120, a number of devices are depicted, including device 122, 124, and 126. The devices 122, 124, and 126 could be server computers (e.g., running virtual machines), desktop computers, or any other type of computing device. While only three devices are depicted, the second area 120 can contain any number of computing devices (e.g., any number of servers, desktop computers, database systems, networking devices, routers, switches, etc.). In addition, the second area 120 contains an egress device 128, which is a routing device that connects the devices of the second area 120 to the Internet 130. While only one egress device is depicted, the second area 120 can contain any number of routing devices.

Other devices 150 and 152 (e.g., customers of the business that is operating the networks of the first area 110 and the second area 120) also connect to the Internet 130. For example, the other devices 150 and 152 may connect via other network carriers (not depicted), such as Internet service providers, which can form a part of the Internet 130 and/or be connected the Internet 130.

In the example network environment 100, the first area 110 is sending probe packets to the second area 120 via the Internet 130. The path that the probe packets take (e.g., as determined by traceroutes and/or other tools or protocols) from the first area 110 (which is the source area in this example) to the second area 120 (which is the destination area in this example) is depicted as forward path 140 and return path 145. For example, the probe packets could be sent from device 112 (the source device in this example) in the first area 110 to device 122 (the destination device in this example) in the second area 120. Using this example, the forward path 140 taken by the probe packets would be from device 112, to egress device 118 (e.g., a router in the first area 110 providing transit to the Internet 130), to AS 6762 132, to AS 2914 134, to egress device 128 (e.g., a router in the second area 120 providing transit to the Internet 130), and finally to device 122. Using this example, the return path 145 taken by the probe packets would be from device 122, to egress device 128, to AS 1299 136, to egress device 118, and finally to device 112.

Using the forward path 140 and the return path 145, as well as information from the probe packets (e.g., IP path information), sources of packet loss can be determined. For example, packet loss can be assigned to the various nodes (e.g., nodes 132, 134, and 136) along the paths (e.g., forward path 140 and return path 145), as well as nodes representing locations within the areas, based on annotated IP path information. Using the packet loss assigned to the nodes, along with packet loss assigned from other probe packets (e.g., other probe packets between the first area 110 and the second area 120 and/or between other areas connected to the Internet 130, which are not depicted), epicenters of packet loss can be determined. For example, a graph can be generated from the nodes with assigned packet loss from many probe packets, and from the graph nodes with packet loss higher than their neighboring nodes in the graph can be identified as epicenters of packet loss.

A monitoring agent 160 can perform operations for detecting and locating sources of packet loss using probe packets. The monitoring agent can be implemented in software and/or hardware (e.g., software running on a server, virtual machine, or network device). Monitoring agent 160 operates within the first area 110. However, in general the monitoring agent can operate in other areas (e.g., in the second area 120 or in other areas) and/or within the Internet 130. The monitoring agent 160 can also be implemented as a distributed service (e.g., running in multiple areas or locations). In some implementations, the monitoring agent 160 generates and sends the probe packets to a corresponding monitoring agent in the second area 120 (and the monitoring agent in the second area 120 sends probe packets in the reverse direction to the monitoring agent 160 in the first area 110).

In the technologies described herein, probe packets are used to monitor the health of the network and locate network problems. Probe packets refer to ping packets, traceroute packets, and/or other types of network packets that can be used to determine packet loss and/or path information that are sent between devices (e.g., computing devices, such as servers, desktops, network devices, etc.). Ping and traceroute packets can be sent via a variety of network protocols, including Internet Control Message Protocol (ICMP) and User Datagram Protocol (UDP). In some implementations, ICMP and UDP are used to send ping packets, and ICMP is used to send traceroute packets.

Ping is used to determine whether there is network packet loss between a source device (the computing device that is sending the ping packet) and a destination device (the computing device that is receiving the ping packet). If a ping packet, sent from the source device, reaches the destination device, and the response packet from the remote device is received by the source device, then the ping was successful. Otherwise, there is packet loss, either along the forward path (from the source device to the destination device) or along the reverse path (from the destination device to the source device).

Traceroute is used to determine the path that network packets take between a source device and a destination device. Traceroutes sent in the forward direction (from the source device to the destination device) can be used to determine the forward path, and traceroutes sent in the return direction (from the destination device to the source device) can be used to determine the return path. Traceroutes can be performed using various network protocols, including ICMP, UDP, and Transmission Control Protocol (TCP).

In some implementations, other protocols and/or network tools can be used to determine the IP path between a source device and a destination device (e.g., in addition to or in place of using traceroutes). Examples of other network tools that can be used include PathPing and MTR.

Probe packets are sent between a source device (with a source Internet protocol (IP) address) and a destination device (with a destination IP address). The source device (e.g., a server computer, desktop computer, virtual machine, network device, or another type of computing device) can be located in a source area and the destination device (e.g., a server computer, desktop computer, virtual machine, network device, or another type of computing device) can be located in a destination area.

In the technologies described herein, probe packets travel from a source device to a destination device along a forward path and return along a return path. Both ping and traceroute packets are bi-directional because they each need to reach devices along the path and send replies back.

If probe packets are only sent along a forward path (from a source device to a destination device), then the path that the packets take along the forward path (the IP addresses and/or the autonomous system nodes) will be known. However, the return path that the reply packets take will not be known. For example, a specific traceroute packet may reach a destination device, but in order to know that the specific traceroute packet reached the destination device, the reply to the specific traceroute packet from the destination device must return successfully to the source device. But, reply packets from the destination device to the source device may not take the same path through the network that the forward traceroute took. In other words, the forward path may not be the same as the return path.

In order to identify problems along the return path, in some implementations probe packets are sent in both directions. For example, if forward probe packets (sent along the forward path from the source device to the destination device) fail at or near the destination device (e.g., within a destination area), then return probe packets (sent in the reverse direction, from the destination device to the source device) can be used to identify the source of the packet loss. The return probe packets can be used to identify the source because the return probe packets likely take the same path through the network as the reply packets returned from the forward probe packet. For example, the return probe packets (e.g., traceroutes sent in the reverse direction, from the destination device to the source device) are likely to take the same path through the network as the reply packets from the forward probe packets because they have the same source and destination IP address. The return probe packets can also be configured to have the same port numbers (e.g., source port and/or destination port), to use the same protocol, and/or have other network attributes configured to be the same, which can increase the likelihood that the return probe packets take the same path as the reply packets from the forward probe packets.

In the technologies described herein, IP path information obtained from a traceroute (or another tool or protocol) is annotated in order to transform (e.g., aggregate) the IP path information into a sequence of autonomous systems (referenced by their corresponding autonomous system numbers (ASNs)). In some implementations, the annotated IP path information is also used aggregate by location or based on another grouping (e.g., by business, by IP prefix, etc.). IP path information is first obtained between two computing devices, a source device and a destination device. The IP path information comprises a list of IP addresses of the devices (e.g., routers, gateways, or other network devices), also called hops, along the path between the source and destination. IP path information can contain additional information as well, such as round-trip times, hostnames, etc. The following table, Table 1, is a simplified example of IP path information from a traceroute between a source device (with an IP address of 177.71.207.35) and a destination device (with an IP address of 54.252.255.13). The time-to-live (TTL) indicates the order, or hop count, of each device in the path, with TTL 0 being the source device, and TTL 10 being the destination device.

TABLE 1

Example IP path Information

| TTL | IP Address |
| --- | --- |
| 0 | 177.71.207.35 |
| 1 | 177.71.128.12 |
| 2 | 177.72.240.252 |
| 3 | 195.22.219.136 |
| 4 | 195.22.199.179 |
| 5 | 129.250.4.250 |
| 6 | 129.250.2.219 |
| 7 | 129.250.7.69 |
| 8 | 129.250.3.17 |
| 9 | 54.240.192.115 |
| 10 | 54.252.255.13 |

Once the IP path information has been obtained, it is annotated. Annotation involves determining which autonomous systems the IP addresses belong to. For example, each of the IP address entries in the IP path information can be analyzed to determine which autonomous system the IP address belongs to. In order to make the determination, autonomous system information can be obtained for mapping the IP addresses to the autonomous system numbers using public routing data (e.g., available from Route Views, www.routeviews.org). Mapping IP address to autonomous system number can include looking up the IP address prefixes for the devices along the path (e.g., the prefix for the IP address 129.250.4.250 is 129.250.0.0/16) and determining the autonomous system numbers in the public routing data that are associated with the prefixes. The following table, Table 2, is a simplified example of the IP path information from Table 1 that has been annotated with autonomous system numbers.

TABLE 2

Example Annotated IP path Information

| TTL | IP Address | ASN | Location |
| --- | --- | --- | --- |
| 0 | 177.71.207.35 | 16509 | Location1 |
| 1 | 177.71.128.12 | 16509 | Location1 |
| 2 | 177.72.240.252 | 16509 | Location2 |
| 3 | 195.22.219.136 | 6762 | |
| 4 | 195.22.199.179 | 6762 | |
| 5 | 129.250.4.250 | 2914 | |
| 6 | 129.250.2.219 | 2914 | |
| 7 | 129.250.7.69 | 2914 | |
| 8 | 129.250.3.17 | 2914 | |
| 9 | 54.240.192.115 | 16509 | Location3 |
| 10 | 54.252.255.13 | 16509 | Location3 |

In some implementations, annotating the IP path information also involves determining which location the IP address entries belong to. In this way, aggregation of the IP address can be performed based on location. The location can refer to a group of related devices (e.g., a group of devices within an area that are related based on routing policy, IP prefix, business, and/or other criteria). For example, a given area (e.g., the first area 110) can contain one or more groups of devices (e.g., a first set of IP addresses that are associated with a location labeled Location1 and a second set of IP addresses that are associated with a location labeled Location2).

Using the annotated IP path information, the path IP addresses can be transformed into a path of autonomous systems (the AS path). The AS path is a description of the nodes (e.g., autonomous system nodes, location nodes, or nodes based on other groupings) from the source device to the destination device, and can be created by aggregating neighboring entries in the annotated IP path information based autonomous system number and/or based on another grouping criteria (e.g., by IP prefix, by location, by business, etc.). For example, the AS path describes the nodes through which the probe packets traveled between the source device and the destination device. Using the annotated IP path information from Table 2, the AS path from the source device to the destination device is the following nodes: 16509, 6762, 2914, and 16509. In this example, the source device and the destination device happen to be in the same autonomous system because they are both within the internal networks of a business or organization (e.g., the source device can be within an internal network of a business in a first geographical area and the destination device can be within a remote internal network of a business in a second geographical area, such as a different state or country). However, in general the source and destination devices need not be within an internal network of a business or organization. For example, the source device and/or destination device can be within the Internet.

In some implementations, the AS path includes locations for devices within the areas. In this case, using the annotated IP path information from Table 2, the AS path is the following nodes: Location1, Location2, 6762, 2914, and Location3. As this example illustrates, the AS path can be created by aggregating neighboring locations within an area and aggregating neighboring autonomous system numbers outside of the areas (on the Internet). In some implementations, only the IP addresses in the source and destination areas are aggregated based on location, while the IP addresses on the public Internet are aggregated based on autonomous system number, which is reflected in Table 2 above.

In some implementations, annotating the IP path information comprises determining device names or hostnames for at least some of the devices along the path. For example, device names and/or other information (e.g., areas) can be determined for internal networks of a business or organization but not for devices on the Internet.

Figure 2:
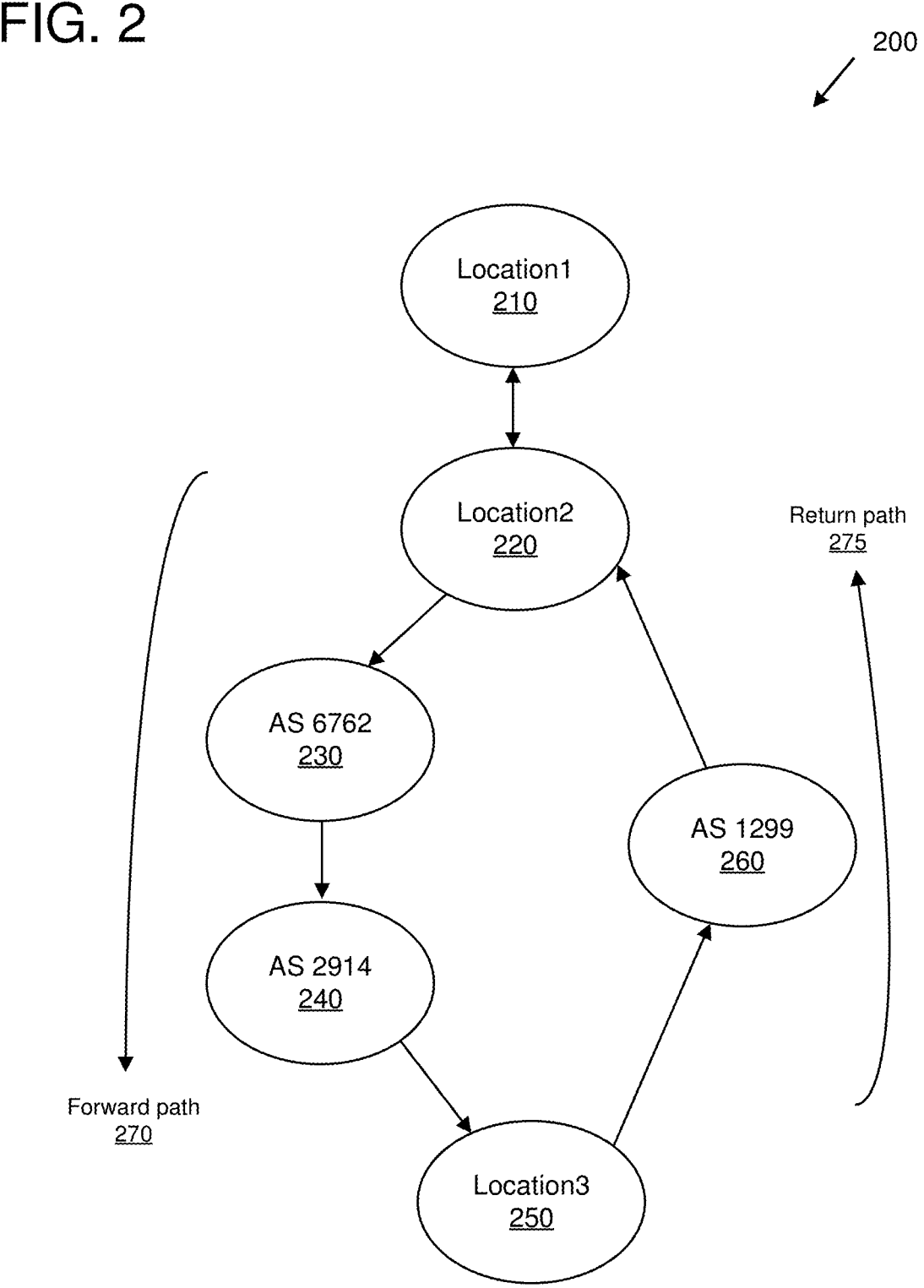
FIG. 2 is a diagram depicting example autonomous system paths comprising nodes.

FIG. 2 is a diagram 200 depicting example autonomous system paths comprising nodes. The diagram reflects the annotated IP path information from Table 2 above (used for the forward path) along with return path nodes. In the diagram 200, the forward path 270 begins with node Location1 210 and then proceeds to node Location2 220, which are both within a source area. The forward path 270 then proceeds to AS 6762 230 and AS 2914 240, which are on the Internet. The forward path 270 ends at node Location3 250, which is in the destination area. The return path begins with node Location3 250, proceeds to AS 1299 260 (on the Internet), and then to node Location2 220 and finally node Location1 210.

In the technologies described herein, packet loss is attributed to one or more nodes along the path. From the results of the probe packets, the path between the source device and the destination device will be known. Also, the amount of packet loss will be known (e.g., the loss percentage), which can be determined from network statistics (e.g., from probe packet results, such as from ping packets). From these results, packet loss can be attributed to the nodes along the path that are responsible for the packet loss.

In some implementations, loss attribution is performed based on a number of rules, which can be applied separately and/or in combination. According to a first rule, packet loss is uniformly distributed among the nodes when packets measuring the forward IP path reach the destination device (e.g., when the forward traceroute is successful). When the packets (from the source device to the destination device) successfully reach the destination device, then there is no evidence to indicate that any one node is more likely the source of the packet loss than any other node. Therefore, the packet loss is distributed evenly over the nodes in the forward path.

According to a second rule, when packets measuring the forward IP path do not reach the destination device (e.g., when the forward traceroute is not successful), packet loss is attributed to the last seen node (e.g., the last hop that the packets performing traceroute successfully reached). An IP path is not successful when packets measuring the path do not reach the destination (e.g., the packets fail at some intermediary hop). In this situation, all of the packet loss is attributed to the last seen node. In some implementations, the second rule has exceptions, which are the third and fourth rules below.

According to a third rule, when the packets measuring the forward IP path do not reach the destination device and the egress routers are using static routes to the external carriers, and the last seen node is identified (according to the second rule), then the last seen device in the last seen node is examined. If the last seen device is an egress router (providing transit to an external network AS), then all of the packet loss is attributed to the next node. This is possible because the next node is known due to the static route of the egress router (e.g., the static route indicates which external carrier to use for probe packets destined for a given destination area).

According to a fourth rule, when the packets measuring the forward IP path do not reach the destination device, and the last seen node is in a destination area, then the return path (from the destination device to the source device) is taken into account. Specifically, if packets measuring the return IP path do not reach the source device, packet loss is attributed to the last seen node in the return direction. In this situation, all of the packet loss is attributed to the last seen node in the return direction. However, like the third rule, there is an exception if the last seen device in the last seen node is an egress router for the return path (and the egress router is using static routes to the external carriers), then all of the packet loss is attributed to the next node in the return path. This is possible because the next node is known due to the static route of the egress router.

In some implementations, the above four rules are applied in combination in order to distribute the packet loss among the nodes.

FIG. 3 is a diagram depicting an example table 300 for determining packet loss attribution. The example table 300 reflects the four rules discussed above for performing packet loss attribution, and handles some additional loss cases as well. The example table 300 is described in terms of traceroutes, however any type of tool and/or protocol that determines an IP path between the source and destination devices can be used. In the example table 300, the forward traceroute failure modes are depicted along the left-hand side, at 310. There are six forward traceroute failure modes depicted: "traceroute success" (the forward traceroute was successful), "in source area, before egress device" (the forward traceroute fails in the source area before the egress device has been reached), "in source area, at egress device" (the forward traceroute fails in the source area at the egress device), "on the Internet" (the forward traceroute fails somewhere on the Internet, which means it failed within one of the external carriers that make up the Internet), "in destination area" (the forward traceroute fails in the destination area), and "in other area" (the forward traceroute fails in some other area not accounted for by the other modes, such as on a private network between a source and destination area). Some implementations use all six forward traceroute failure modes, while other implementations may use fewer than all of them (e.g., some may not use the "in other area" mode).

In the example table 300, the return traceroute failure modes are depicted along the top, at 320. There are six return traceroute failure modes, which are the same as the forward traceroute failure modes, but in the reverse direction. Some implementations use all six return traceroute failure modes, while other implementations may use fewer than all of them (e.g., some may not use the "in other area" mode).

Using the example table 300, packet loss attribution can be performed using results of the forward traceroute failure mode (at 310) and in some situations the return traceroute failure mode (at 320). As the example table 300 illustrates, the only time that the return traceroute failure mode comes into play is when the forward traceroute failure mode is "in destination area."

The intersection indicates how the attribution will be performed, and there are six cases. The first case is "forward all," in which packet loss is distributed evenly across the nodes in the forward path. For example, if the forward traceroute was successful, then "forward all" attribution is performed regardless of the return traceroute failure mode.

The second case is "forward last seen," which will assign all packet loss to the last seen node in the forward path.

The third case is "forward egress," which will assign all of the packet loss to the next node after the egress device (e.g., the egress router) in the forward path. This case corresponds to the third rule discussed above.

The fourth case is "return last seen," which assigns all packet loss to the last seen node in the return path.

The fifth case is "return egress," which will assign all of the packet loss to the next node after the egress device (e.g., the egress router) in the return path. This case corresponds to the fourth rule exception discussed above.

The sixth case is "round-trip all," which happens when both the forward and return traceroutes fail in their respective destination areas. In this case, packet loss is distributed evenly across the nodes in the forward and reverse paths (i.e., among the nodes in the round-trip path).

In some implementations, use of the "forward egress" and "return egress" cases requires that the probe packets use static routes when egressing the source and destination areas. The static routes allow determination of the next node, which is the next hop carrier (also called a transit provider) after the egress router.

The nodes depicted in FIG. 2 can be used to illustrate operation of some of the above rules and cases. For example, according to the first rule (corresponding to the "forward all" case), if the forward traceroute was successful, then the packet loss would be distributed evenly among the nodes in the forward direction. With reference to FIG. 2, the packet loss would be evenly distributed among nodes Location1 210, Location2 220, AS 6762 230, AS 2914 240, and Location3 250. As another example, if the forward traceroute failed at AS 2914 240 (the node AS 2914 240 was the last node seen by the forward traceroute), then according to the second rule (corresponding to the "forward last seen" case) would assign all of the packet loss to AS 2914 240. As another example, if the forward traceroute was unsuccessful, and the last seen node was Location3 250 (in the destination area for the forward traceroute), and the return traceroute also failed in Location3 250 (the source area for the return traceroute) at the egress device, then all of the packet loss would be assigned to AS 1299 260 (the next node after the egress device in the return path, according to the "return egress" case which corresponds to the fourth rule exception).

Also, the amount of packet loss will be known (e.g., the loss percentage), which can be determined from network statistics (e.g., from probe packet results, such as from ping packets). From these results, packet loss can be attributed to the nodes along the path that are responsible for the packet loss In some implementations, the packet loss is attributed to node(s) as a scalar value. For example, the packet loss for a probe packet (or set of probe packets) can be attributed as a value to one or more nodes that are determined to be responsible for the loss (e.g., using the above rules). As an example, if a set of probe packets is experiencing 30% loss, then the scalar value of 30 can be attributed to one or more nodes (e.g., if one node is determined to be fully responsible, then the scalar value of 30 would be assigned to the one node, but if six nodes are determined to be responsible, then the scalar value of 5 would be assigned to each of the six nodes). When a packet loss value is assigned to a given node, it is added to the given node's current loss value. For example, from a number of previous probe packets, a node could have an assigned loss value of 250. If a new loss value of 25 is assigned to the node, then the node's total loss value would be increased to 275. Instead of, or in addition to, assigning the loss percentage as a scalar values, other values or indicators can be assigned to the nodes to indicate their relative share of the packet loss.

In the technologies described herein, epicenters of packet loss can be determined from the packet loss attributed to the nodes along the paths. For example, a graph of nodes can be created reflecting packet loss assigned to nodes from a number of probe packets (e.g., many probe packets) sent between a number of source and destination devices (e.g., located in a number of source and destination areas). The graph can be built using the path data from the IP paths (e.g., generated from traceroutes), which reflects connections between the nodes. The graph can be updated on a periodic basis (e.g., updated every minute) and can reflect assigned packet loss over a time period (e.g., for the last hour, day, or some other time period). In some implementations, each node in the graph has a total loss property which is the sum of the packet loss assigned to the node, and an edge (connection) between any pair of nodes represents adjacency in at least one IP path (e.g., from at least one traceroute).

The sources of packet loss, called epicenters, are identified using assigned packet loss information (e.g., as represented by the graph of nodes). In some implementations, an epicenter is identified if a given node has assigned packet loss greater than the given node's neighboring nodes. A given node's neighboring nodes are those nodes that are connected to the given node by an edge of the graph (e.g., as determined from the traceroutes). For example, a specific node (e.g., a collection of network devices, such as routers, of a specific Internet carrier) may be connected to a number of other nodes (e.g., to a number of other collections of network devices associated with a corresponding number of other Internet carriers). The epicenters can be determined on a periodic basis (e.g., every minute or other time period) or determined on demand. The epicenters can utilize packet loss data assigned over a time period (e.g., based on packet loss data assigned over the last number of minutes or hours, or some other time period).

Figure 4:
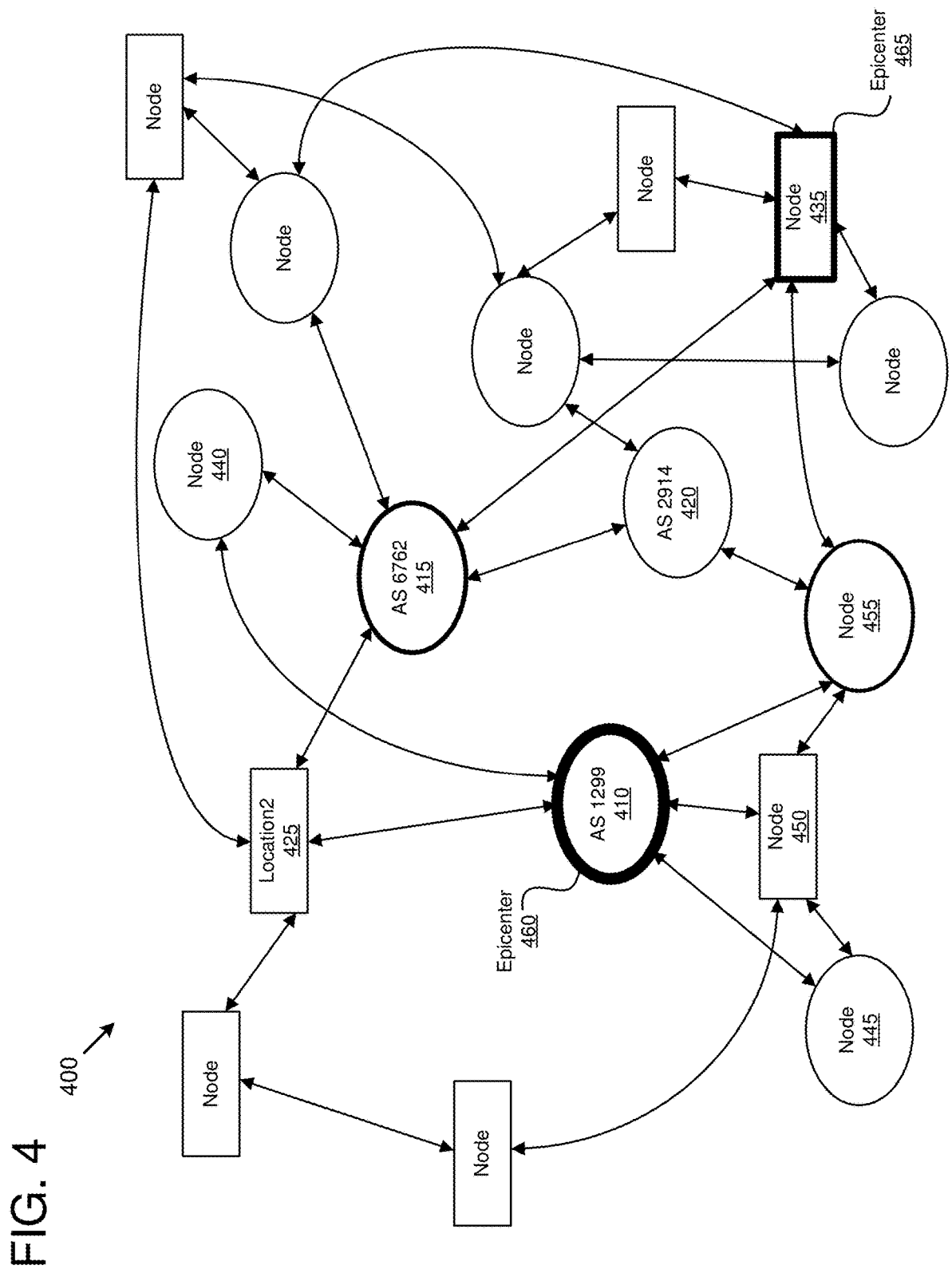
FIG. 4 is an example graph depicting nodes, connections between nodes, and their associated packet loss.

FIG. 4 is an example graph 400 depicting nodes, connections between nodes, and their associated packet loss (that was assigned using the technologies described herein). There are two types of nodes depicted in the example graph 400, ovals represent AS nodes and rectangles represent location nodes.

The total assigned packet loss for a given node is reflected in the example graph 400 by the line thickness of the node. As depicted, node AS 1299 410 has a relatively high total packet loss. As an example, node AS 1299 410 could have a scalar total packet loss value of 1,500. Other nodes also have relatively high total packet loss, such as node AS 6762 415 (e.g., a total value of 800), node 435 (e.g., a total value of 950), and node 455 (e.g., a total value of 325).

In order to determine if a given node is an epicenter of packet loss, the given node is compared to its neighboring nodes (those nodes that are connected via an edge from the given node). If the given node has a total packet loss value greater than that of its neighboring nodes, then it is an epicenter of packet loss. For example, the total packet loss assigned to node AS 1299 410 can be compared with that of nodes Location2 425, 440, 445, 450, and 455. In this example, AS 1299 410 has a higher total packet loss value than its neighboring nodes, and thus is identified as an epicenter, as indicated at 460. As another example, node 435 would be identified as an epicenter, as indicated at 465, as its total packet loss is higher than its neighboring nodes (e.g., node 435 has a total value of 950 which is higher than that of its next highest neighbors AS 6762 415 and node 455, which have total values of 800 and 325 respectively). As another example, node AS 6762 415 and node 455 would not be identified as epicenters because each has at least one neighboring node with a higher total packet loss value.

In the technologies described herein, impacted transit locations can be determined based on the identified epicenters. For example, for each of the epicenters, all of the packet loss that was attributed to the epicenter (the total packet loss for the epicenter) can be grouped by final egress location-node pair. The final egress location-node pair is defined as the last the last egress location (the transit location) where the probe packet egressed prior to having its loss attributed to the epicenter and the node onto which it egressed. The final egress location-node pair can be in the forward path (egressing from the source area) or the return path (egressing from the destination area).

Once the packet loss for an epicenter has been grouped by final egress location-node pair, each location-node pair's relative share of the total packet loss of the epicenter is calculated. This calculation provides a breakdown of which locations are contributing the most to the epicenter, and therefore where the problem appears to be most severe. As an example, the epicenter (e.g., AS 5122) could have three location-node pairs with relative loss shares as follows:

Location4—AS5122, 0.75
Location5—AS5122, 0.20
Location6—AS5122 0.05

This result would tell us that 75% of all of the packet loss attributed to epicenter AS 5122 was accounted for by probe packets egressing Location4 onto AS 5122, 25% of the loss was accounted for by probe packets egressing Location5 onto AS 5122, and 5% of the loss was accounted for by probe packets egressing Location6 onto AS 5122.

The location-pair's relative share of the total packet loss can be used to make network traffic shifting decisions. For example, network traffic for a given area can be shifted away from a transit location that has a high share of the packet loss for an epicenter (e.g., shifting away from the Location4-AS5122 path because it accounts for 75% of the packet loss of the epicenter).

Figure 5:
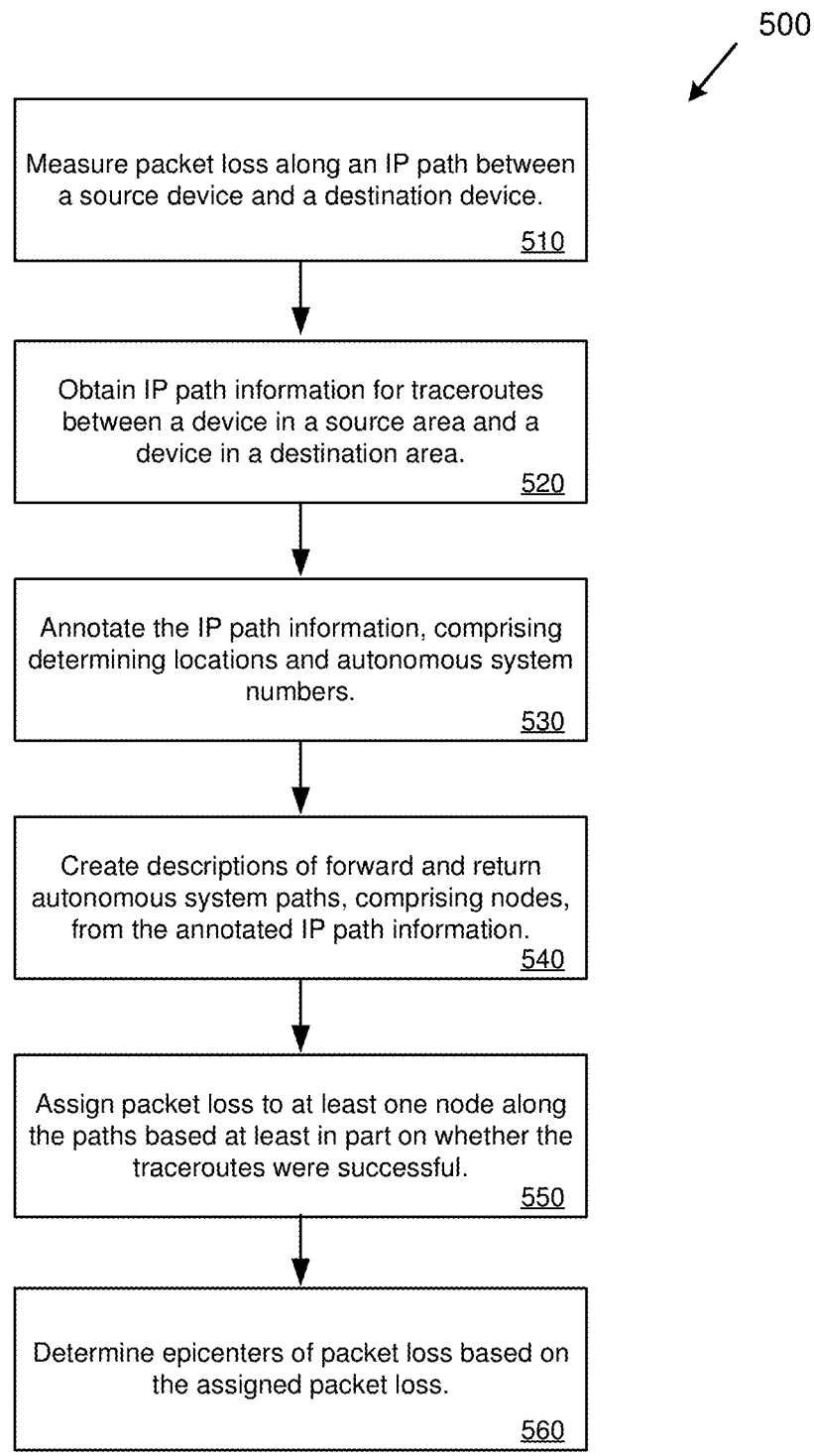
FIGS. 5, 6, and 7 are flowcharts of example methods for determining the source of packet loss.

FIG. 5 is a flow chart of an example method 500 for determining sources of packet loss. The example method 500 can be performed by a monitoring agent (e.g., a software monitoring agent), such as monitoring agent 160.

At 510, packet loss is measured along an IP path between a device in a source area and a device in a destination area. For example, the packet loss can be measured using ping packets and/or other types of probe packets.

At 520, IP path information from traceroutes between the device in the source area and the device in the destination area is obtained. The traceroutes include a forward traceroute and a return traceroute. The traceroutes traverse external network carriers on the Internet between the source area and the destination area. For example, the source area could be the first area 110 and the destination area could be the second area 120.

At 530, the IP path information is annotated, which includes determining locations within the areas and autonomous system numbers for the IP addresses in the IP path information.

At 540, descriptions of forward and return autonomous system paths are created. The paths comprise nodes (representing autonomous systems and/or locations). The descriptions of the paths can be created by aggregating IP addresses into locations within the source and destination areas and aggregating IP addresses into autonomous systems for the external network carriers. Example forward and return paths are depicted in FIG. 2.

At 550, packet loss is assigned to at least one node along the paths based at least in part on whether network packets performing the traceroutes were successful. The packet loss can be identified using ping packets between the device in the source area and the device in the destination area. The packet loss can be assigned based on the rules and cases described herein (e.g., as depicted in FIG. 3).

Figure 6:
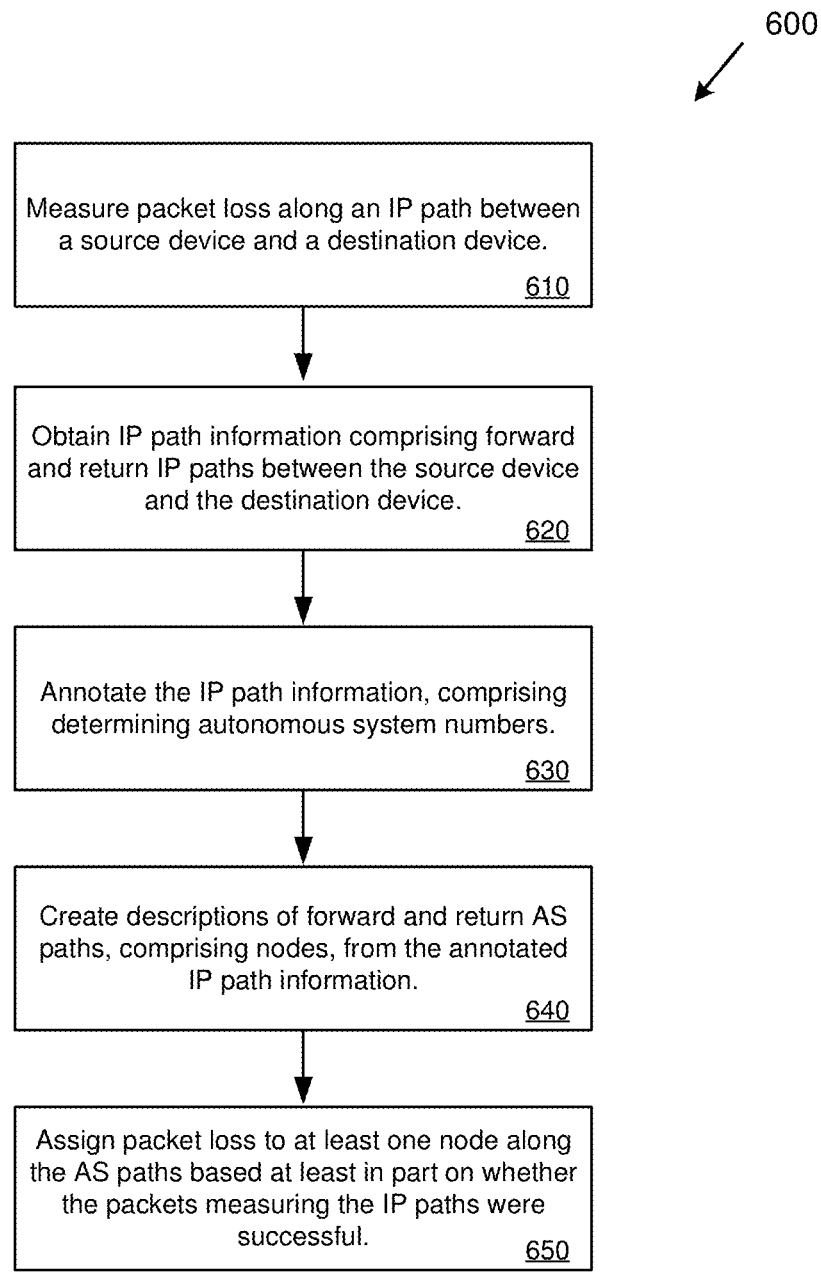

At 560, epicenters of packet loss are determined based at least in part on the assigned packet loss. In some implementations, the epicenters are determined based on assigned packet loss from additional probe packets (e.g., traceroutes) between the source and destination areas and among other areas as well. From the assigned packet loss, a graph of nodes can be created representing connections between the nodes and total assigned packet loss to the nodes. The nodes that have total assigned packet loss greater than their neighboring nodes can be determined to be epicenters FIG. 6 is a flow chart of an example method 600 for determining sources of packet loss. The example method 600 can be performed by a monitoring agent (e.g., a software monitoring agent), such as monitoring agent 160.

At 610, packet loss is measured along an IP path between a source device and a destination device. For example, the packet loss can be measured using ping packets and/or other types of probe packets.

At 620, IP path information is obtained between the source device and the destination device. For example, the IP path information can be obtained from traceroutes and/or other tools or protocols that determine the path that IP packets take between the source and destination devices. The IP path information includes a forward IP path (e.g., a forward traceroute) and a return IP path (e.g., a return traceroute). The IP paths can traverse external network carriers on the Internet between the source device and the destination device. In some implementations, the source device is in a source area (e.g., the first area 110) and the destination device is in a destination area (e.g., the second area 120).

At 630, the IP path information is annotated, which includes determining autonomous system numbers for the IP addresses in the IP path information. In some implementations, locations within areas are determined for at least some of the IP addresses (e.g., those within the areas).

At 640, descriptions of forward and return autonomous system paths are created. The AS paths comprise nodes (representing autonomous systems). The descriptions of the AS paths can be created by aggregating IP addresses into autonomous system numbers for the external network carriers. In some implementations, IP addresses are also aggregated into locations within source and destination areas (e.g., just for IP addresses that are within the source and destination areas). Example forward and return AS paths are depicted in FIG. 2.

At 650, packet loss is assigned to at least one node along the AS paths based at least in part on whether the packets measuring the IP paths were successful (e.g., based at least in part on whether traceroutes were successful). The packet loss can be identified using ping packets between the source device and the destination device. The packet loss can be assigned based on the rules and cases described herein (e.g., as depicted in FIG. 3). Using the assigned packet loss, epicenters can be identified.

Figure 7:
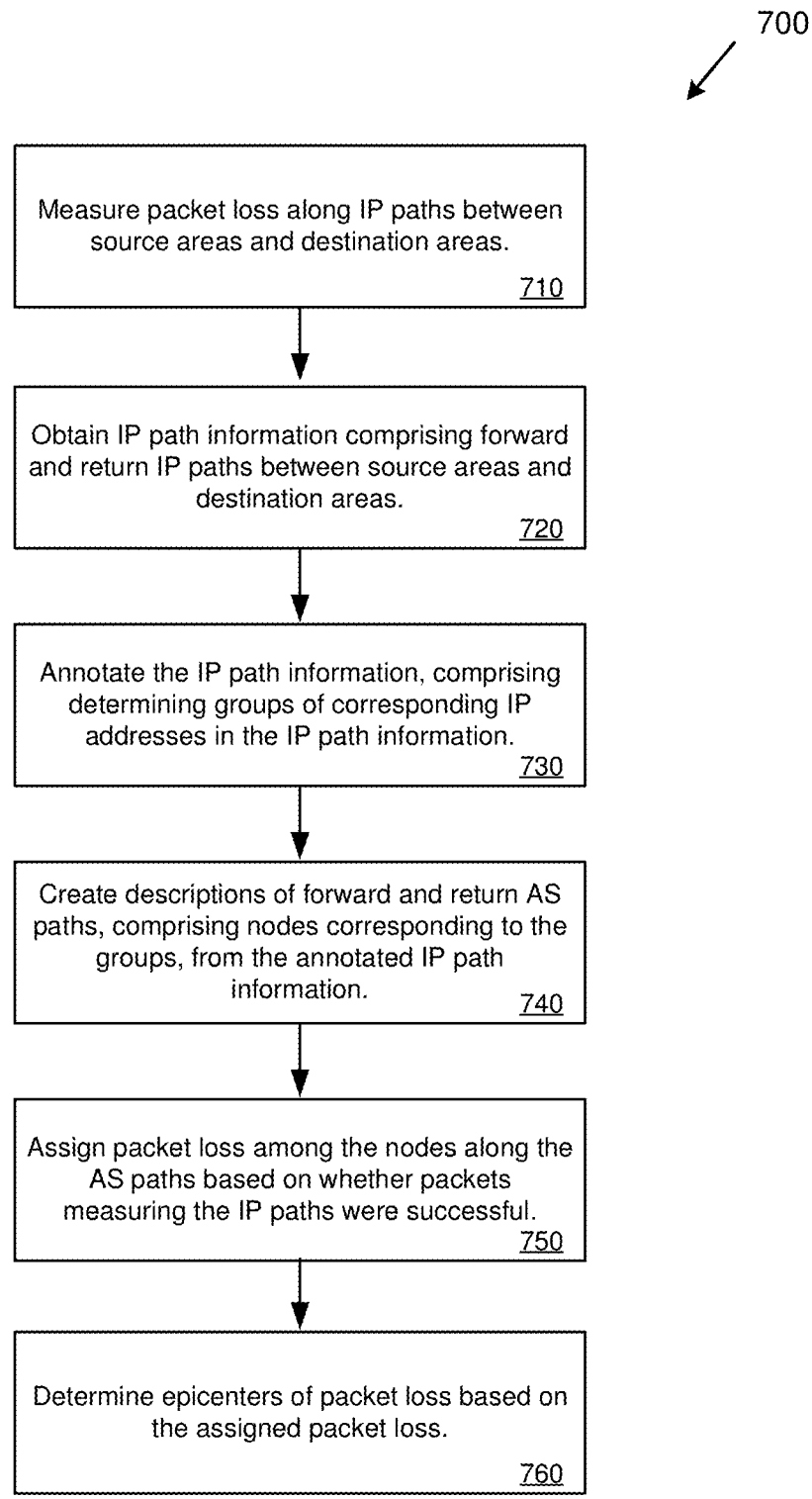

FIG. 7 is a flow chart of an example method 700 for determining sources of packet loss. The example method 700 can be performed by a monitoring agent (e.g., a software monitoring agent), such as monitoring agent 160.

At 710, packet loss is measured along an IP path between source areas and destination areas. For example, the packet loss can be measured using ping packets and/or other types of probe packets.

At 720, IP path information is obtained between the source areas and the destination areas. For example, the IP path information can be obtained from traceroutes and/or other tools or protocols that determine the path that IP packets take between the source and destination devices The IP path information includes forward IP paths (e.g., forward traceroutes) and return IP paths (e.g., return traceroutes). The IP paths traverse external network carriers on the Internet between the source areas and the destination areas.

At 730, the IP path information is annotated, which includes determining groups of corresponding IP addresses in the IP path information. For example, the IP path information from corresponding forward and return path pairs can be annotated separately.

At 740, descriptions of forward and return AS paths are created. The AS paths comprise nodes (representing a business or other organization, a location associated with a business or other organization, an IP prefix, an autonomous system, or based on some other criteria). For example, the descriptions of the AS paths can be created by aggregating IP addresses into locations within the source and destination areas and aggregate IP addresses into autonomous system numbers for the external network carriers.

At 750, packet loss is assigned among the nodes along the AS paths based at least in part on whether the packets measuring the IP paths were successful (e.g., based at least in part on whether traceroutes were successful). The packet loss can be identified using ping packets between the devices in the source areas and the devices in the destination areas. The packet loss can be assigned based on the rules and cases described herein (e.g., as depicted in FIG. 3).

At 760, epicenters of packet loss are determined based at least in part on the assigned packet loss. From the assigned packet loss, a graph of nodes can be created representing connections between the nodes and total assigned packet loss to the nodes. The nodes that have total assigned packet loss greater than their neighboring nodes can be determined to be epicenters.

Figure 8:
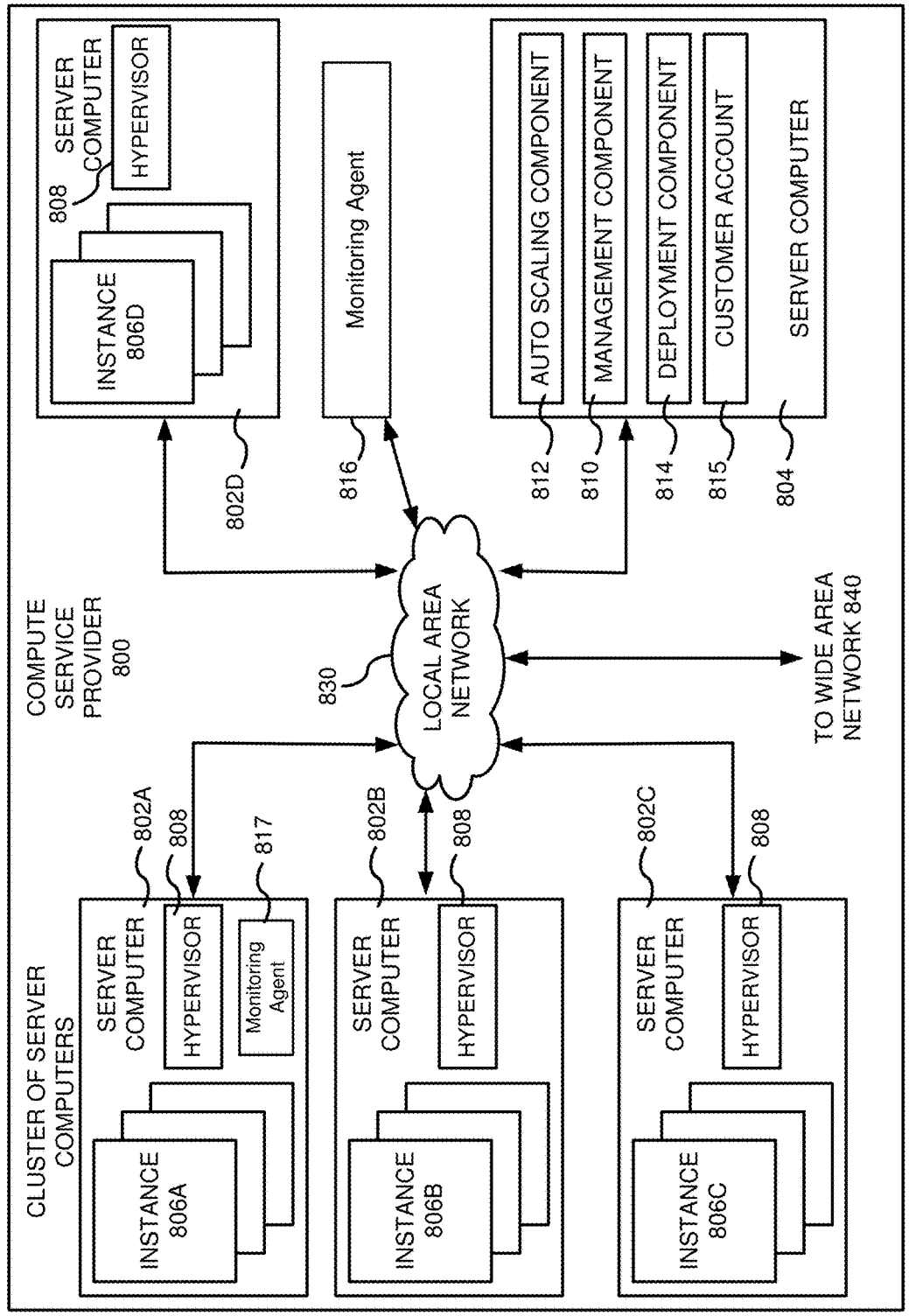
FIG. 8 is an example system diagram showing a plurality of virtual machine instances running in a multi-tenant environment.

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (i.e. a computer) that executes applications like a physical machine. In the example, each of the servers 802A-802D can be configured to execute a hypervisor 808 or another type of program configured to enable the execution of multiple instances 806 on a single server. For example, each of the servers 802A-802D can be configured (e.g., via the hypervisor 808) to support one or more virtual machine slots, with each virtual machine slot capable of running a virtual machine instance (e.g., server computer 802A could be configured to support three virtual machine slots each running a corresponding virtual machine instance). Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can comprise a Clos network. The network 830 can be a local area network (LAN), such as a multi-tiered network (e.g., Clos network), and can be connected to a wide area network (WAN) 840 so that end users can access the compute service provider 800. The wide area network 840 can connect to a border network fabric providing access to the internet and/or to other networks (e.g., peering connections to other network locations). It should be appreciated that the network topology illustrated in FIG. 8 has been simplified and that many more networks and networking devices can be utilized to interconnect the various computing systems disclosed herein.

In some implementations, a monitoring agent 816 performs operations for determining the source of packet loss. For example, the monitoring agent 816 can be a software monitoring agent running on a host computer. The monitoring agent 816 can obtain IP path information (e.g., from traceroutes and/or from other probe packets sent from devices within the local network 830, which can represent an area, to devices within a remote network area accessible via the wide area network 840). The monitoring agent 816 can annotate the IP path information, create forward and return paths, assign packet loss among nodes, determine epicenters, and/or make network traffic decisions based on the results.

Figure 9:
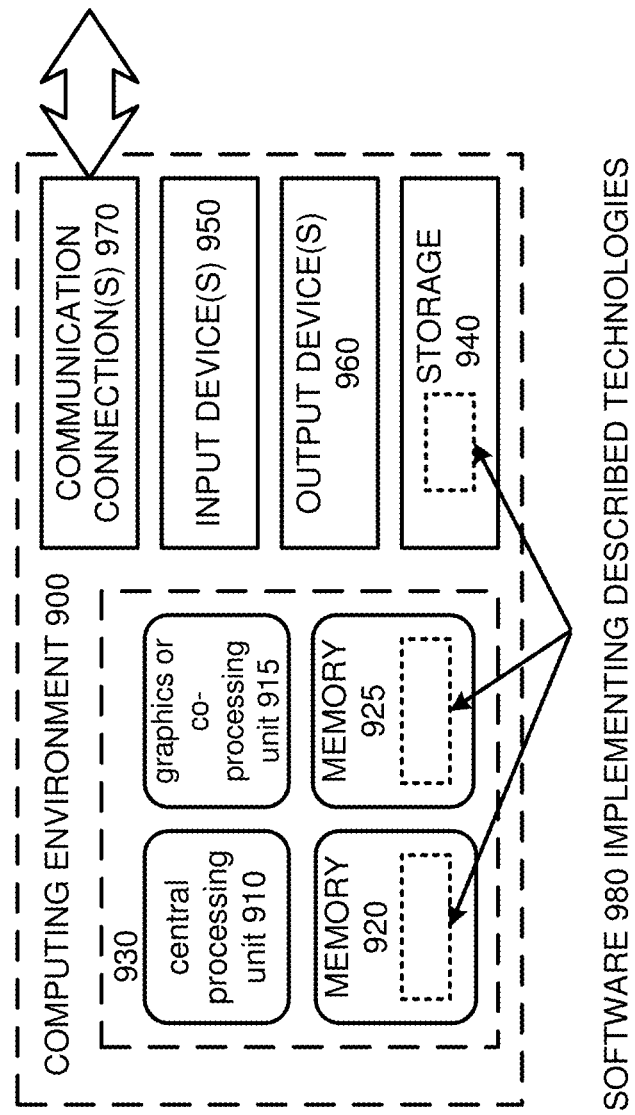
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A method, implemented by a computing system, the method comprising:
    measuring packet loss along an Internet protocol (IP) path between a device in a source area and a device in a destination area;
    obtaining IP path information from traceroutes between the device in the source area and the device in the destination area, wherein the traceroutes comprise a forward traceroute and a return traceroute, and wherein network packets of the traceroutes traverse external network carriers between the source area and the destination area;
    annotating the IP path information, the annotating comprising determining locations and autonomous system numbers for corresponding IP addresses in the IP path information;
    creating descriptions of forward and return autonomous system (AS) paths, comprising nodes, from the annotated IP path information, wherein the nodes aggregate IP addresses into locations within the source and destination areas and aggregate IP addresses into AS numbers for the external network carriers;
    assigning packet loss to at least one node along the AS paths based on whether packets performing the traceroutes were successful; and based on the assigned packet loss among the nodes, determining epicenters of packet loss, wherein the epicenters indicate sources of the packet loss, and wherein determining the epicenters of the packet loss comprises:
  identifying which of the nodes have assigned packet loss greater than neighboring nodes.

2. The method of claim 1, wherein assigning packet loss to the at least one node comprises:
  if the forward traceroute was successful, dividing the packet loss evenly among nodes along the forward AS path; and
  if the forward traceroute was unsuccessful, assigning all of the packet loss to a last seen node along the forward AS path.

3. The method of claim 1, wherein assigning packet loss to the at least one node comprises:
  if the forward traceroute was successful, dividing the packet loss evenly among nodes along the forward AS path; and
  if the forward traceroute was unsuccessful:
    if a last seen node in the forward AS path is in the source area and a last seen device is an egress router in the source area, assigning all of the packet loss to a next node along the forward AS path;
    if the last seen node in the forward AS path is in the destination area, assigning all of the packet loss to a last seen node along the return AS path, except where the last seen node along the return AS path is in the destination area and a last seen device is an egress router, assigning all of the packet loss to a next node along the return AS path; and
    otherwise, assigning all of the packet loss to a last seen node along the forward AS path.

4. The method of claim 1, wherein determining the epicenters of the packet loss further comprises:
  for each node:
    when the node has an assigned packet loss greater than the node's neighboring nodes, identifying the node as an epicenter.

5. The method of claim 1, wherein determining the epicenters of the packet loss further comprises:
  creating a graph of nodes, wherein the graph reflects the packet loss assigned to the at least one node in addition to packet loss assigned from additional probe packets, comprising pings and traceroutes, between devices in the source and destination areas, wherein the graph of nodes comprises the nodes of the forward and return AS paths; and
  identifying nodes of the graph of nodes that have assigned packet loss greater than their neighboring nodes as the epicenters of the packet loss.

6. The method of claim 5, further comprising:
  for each of the epicenters:
    grouping the packet loss for the epicenter by location-node pairs; and
    assigning each location-node pair's relative share of packet loss for the epicenter; and
  providing the location-node pairs, and their associated packet loss share.

7. A computing device comprising:
  a processing unit; and
  a network interface;
  wherein the computing device is configured to perform operations, the operations comprising:
    measuring packet loss along an Internet protocol (IP) path between a source device and a destination device;
    obtaining IP path information between the source device and the destination device, wherein the IP path information comprises a forward IP path and a return IP path;
    annotating the IP path information comprising determining autonomous system numbers for corresponding IP addresses in the IP path information;
    creating descriptions of forward and return autonomous system (AS) paths, comprising nodes, from the annotated IP path information; and
    assigning packet loss to at least one node along the AS path based on whether packets measuring the IP paths were successful, wherein assigning packet loss to the at least one node comprises:
      if packets measuring the forward IP path reached the destination device, dividing the packet loss evenly among nodes along the forward AS path; and
      if packets measuring the forward IP path did not reach the destination device, assigning all of the packet loss to a last seen node along the forward AS path.

8. The computing device of claim 7 wherein the source device is in a source area, wherein the destination device is in a destination area, and wherein the source and destination areas are connected via the Internet.

9. The computing device of claim 8, wherein the computing device is configured to perform a subsequent iteration of the operations, in which additional packets are transmitted for a second measurement of packet loss along the forward IP path and the return IP path between the source device and the destination device, and wherein assigning the second measurement of packet loss to the at least one node in the subsequent iteration comprises:
  if the additional packets measuring the forward IP path reached the destination device, dividing the second measurement of packet loss evenly among nodes along the forward AS path; and
  if the additional packets measuring the forward IP path did not reach the destination device:
    if a last seen node in the forward AS path is in the source area and a last seen device is an egress router in the source area, assigning all of the second measurement of packet loss to a next node along the forward AS path;
    if the last seen node in the forward AS path is in the destination area, assigning all of the second measurement of packet loss to a last seen node along the return AS path, except where the last seen node along the return AS path is in the destination area and a last seen device is an egress router, assigning all of the second measurement of packet loss to a next node along the return AS path; and
    otherwise, assigning all of the second measurement of packet loss to a last seen node along the forward AS path.

10. The computing device of claim 8, wherein annotating the IP path information comprises determining locations for corresponding IP addresses in the IP path information, and wherein the nodes aggregate IP addresses into locations within the source and destination areas and aggregate IP addresses into autonomous system numbers for external network carriers.

11. The computing device of claim 7, the operations further comprising:

based on the assigned packet loss among the nodes, determining epicenters of packet loss, wherein the epicenters indicate sources of the packet loss.

12. The computing device of claim 11, wherein determining the epicenters of the packet loss comprises:
creating a graph of nodes, wherein the graph reflects the packet loss assigned to the at least one node in addition to packet loss assigned from additional probe packets between devices in the source and destination areas, wherein the graph of nodes comprises the nodes of the forward and return AS paths; and
identifying nodes of the graph of nodes that have assigned packet loss greater than their neighboring nodes as the epicenters of the packet loss.

13. The computing device of claim 11, the operations further comprising:
for each of the epicenters:
grouping the packet loss for the epicenter by location-node pairs; and
assigning each location-node pair's relative share of packet loss for the epicenter; and
providing the location-node pairs, and their associated packet loss share.

14. A method, implemented by a computing system, the method comprising:
measuring packet loss along Internet protocol (IP) paths between devices in source areas and devices in destination areas;
obtaining IP path information between the devices in the source areas and the devices in the destination areas, wherein the IP path information comprises a forward IP path and a return IP path, and wherein network packets used to determine the IP path information traverse external network carriers between the source areas and the destination areas;
annotating the IP path information, the annotating comprising determining groups of corresponding IP addresses in the IP path information;
creating descriptions of forward and return autonomous system (AS) paths, comprising nodes corresponding to the groups, from the annotated IP path information;
assigning packet loss among the nodes along the AS paths based on results of the IP paths; and
based on the assigned packet loss among the nodes, determining epicenters of packet loss, wherein the epicenters indicate sources of the packet loss,
wherein assigning packet loss among the nodes comprises:
if packets measuring the forward IP path reached a destination device, dividing the packet loss evenly among nodes along the forward AS path; and
if packets measuring the forward IP path did not reach the destination device, assigning all of the packet loss to a last seen node along the forward AS path.

15. The method of claim 14, further comprising, further comprising, in a subsequent iteration of the method implemented by the computing system, transmitting additional packets for a second measurement of packet loss along the forward IP path and the return IP path between a source device and the destination device, wherein assigning the second measurement of packet loss among the nodes in the subsequent iteration of the method comprises:
if the additional packets measuring the forward IP path reach a destination device, dividing the second measurement of packet loss evenly among nodes along a forward AS path; and
if the additional packets measuring the forward IP path do not reach the destination device:
if a last seen node in the forward AS path is in a source area and a last seen device is an egress router in the source area, assigning the second measurement of packet loss to a next node along the forward AS path;
if the last seen node in the forward AS path is in a destination area, assigning the second measurement of packet loss to a last seen node along the return AS path, except where the last seen node along the return AS path is in the destination area and a last seen device is an egress router, assigning the second measurement of packet loss to a next node along the return AS path; and
otherwise, assigning the second measurement of packet loss to a last seen node along the forward AS path.

16. The method of claim 14, wherein the IP addresses in the IP path information are grouped and aggregated:
by location;
by business;
by organization;
by IP prefix; or
by autonomous system (AS).

17. The method of claim 14, further comprising:
shifting network traffic between one of the source areas and one of the destination areas based on the determined epicenters.

18. The method of claim 14, wherein the IP path information is obtained from traceroutes between source and destination devices, and wherein the external network carriers form at least part of the Internet.

* * * * *